US011566978B2

(12) United States Patent
Noguchi et al.

(10) Patent No.: US 11,566,978 B2
(45) Date of Patent: Jan. 31, 2023

(54) SYSTEM PROVIDING AN ULTRASONIC PRETREATMENT FOR SEPARATING PARTICLES FROM AN ANALYSIS SAMPLE

(71) Applicant: Hitachi, Ltd., Tokyo (JP)

(72) Inventors: Toshimitsu Noguchi, Tokyo (JP); Takuya Kambayashi, Tokyo (JP); Akihiro Nojima, Tokyo (JP); Shunsuke Kono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 308 days.

(21) Appl. No.: 16/707,552

(22) Filed: Dec. 9, 2019

(65) Prior Publication Data
US 2020/0182751 A1 Jun. 11, 2020

(30) Foreign Application Priority Data
Dec. 11, 2018 (JP) .............................. JP2018-231672

(51) Int. Cl.
*G01N 1/28* (2006.01)
*G01N 29/22* (2006.01)
(Continued)

(52) U.S. Cl.
CPC .............. *G01N 1/28* (2013.01); *B01D 21/283* (2013.01); *B01D 49/006* (2013.01);
(Continued)

(58) Field of Classification Search
CPC ....... G01N 1/28; G01N 29/223; G01N 35/025
(Continued)

(56) References Cited

U.S. PATENT DOCUMENTS 4,015,464 A * 4/1977 Miller .................. G01N 29/032
73/61.75
4,759,775 A 7/1988 Peterson et al.
(Continued)

FOREIGN PATENT DOCUMENTS

CN     206619487 U  * 11/2017
CN     108101151 A  *  6/2018  ............. B01D 21/02
(Continued)

OTHER PUBLICATIONS

Translation CN-209033581-U (Year: 2019).*
(Continued)

*Primary Examiner* — Alexander A Mercado
*Assistant Examiner* — Monica S Young
(74) *Attorney, Agent, or Firm* — Crowell & Moring LLP

(57) ABSTRACT

The object of the invention is to perform, rapidly and at a low cost, a pretreatment of an analysis sample containing a turbid substance. Provided is an analysis sample pretreatment apparatus in which a clarified liquid is obtained by removing a turbid substance from an analysis sample. The analysis sample pretreatment apparatus includes a cell configured to store the analysis sample, and a cell holder in which at least a part of a housing is opened to mount the cell. The cell holder includes an ultrasonic wave transducer and an ultrasonic wave reflection plate that are disposed on facing plane pairs while sandwiching the cell mounted inside the cell holder. The cell includes a first opening unit from which the analysis sample flows in, a second opening unit from which the clarified liquid flows out, and a third opening unit from which the turbid substance is discharged. In a state where the cell is mounted in the cell holder, the first opening unit is provided at a position lower than an upper end of the ultrasonic wave transducer in a vertical direction, (Continued)

or at a position higher than a lower end of the ultrasonic wave transducer in the vertical direction.

12 Claims, 12 Drawing Sheets

(51) Int. Cl.
  *G01N 35/02* (2006.01)
  *B01D 43/00* (2006.01)
  *B01D 21/28* (2006.01)
  *B01D 49/00* (2006.01)
(52) U.S. Cl.
  CPC ......... *G01N 29/223* (2013.01); *G01N 35/025* (2013.01); *B01D 43/00* (2013.01)
(58) Field of Classification Search
  USPC ...................................................... 73/863.23
  See application file for complete search history.

(56) References Cited

U.S. PATENT DOCUMENTS

| | | | | |
|---|---|---|---|---|
| 5,085,783 | A * | 2/1992 | Feke | B01D 21/283 210/243 |
| 5,164,094 | A * | 11/1992 | Stuckart | C02F 1/52 210/708 |
| 5,980,479 | A | 11/1999 | Kutushov | |
| 2008/0236297 | A1* | 10/2008 | Fleet | G01F 1/667 73/861.28 |
| 2010/0206818 | A1* | 8/2010 | Leong | B01D 21/283 210/748.05 |
| 2012/0329122 | A1* | 12/2012 | Lipkens | C12M 47/02 435/173.7 |
| 2015/0209696 | A1* | 7/2015 | Kambayashi | B01J 19/10 210/243 |
| 2015/0321129 | A1 | 11/2015 | Lipkens et al. | |
| 2016/0089620 | A1* | 3/2016 | Lipkens | B06B 1/0644 435/173.9 |
| 2016/0194219 | A1 | 7/2016 | Kambayashi et al. | |
| 2016/0363579 | A1* | 12/2016 | Gilmanshin | B03B 1/04 |
| 2017/0088809 | A1* | 3/2017 | Lipkens | B06B 1/0223 |
| 2017/0191022 | A1* | 7/2017 | Lipkens | C12M 29/02 |
| 2017/0267991 | A1* | 9/2017 | Lipkens | B06B 1/0644 |
| 2017/0304746 | A1* | 10/2017 | Lipkens | B01D 17/02 |
| 2017/0321208 | A1* | 11/2017 | Lipkens | C12N 1/02 |
| 2018/0296954 | A1 | 10/2018 | Trampler et al. | |
| 2019/0299129 | A1* | 10/2019 | Noguchi | B01D 21/2444 |

FOREIGN PATENT DOCUMENTS

| | | | |
|---|---|---|---|
| CN | 209033581 U | * | 6/2019 |
| JP | 2001-502225 A | | 2/2001 |
| JP | 2005-017214 A | | 1/2005 |
| JP | 2015-049163 A | | 3/2015 |
| JP | 2017-515669 A | | 6/2017 |
| JP | 2018-069135 A | | 5/2018 |
| KR | 20160117744 A | * | 10/2016 |
| WO | WO 2015/025395 A1 | | 2/2015 |

OTHER PUBLICATIONS

CN-206619487-U (Year: 2017).*
Translation KR 20160117744 (Year: 2016).*
Japanese-language Office Action issued in Japanese Application No. 2018-231672 dated Feb. 22, 2022 with English translation (12 pages).

* cited by examiner

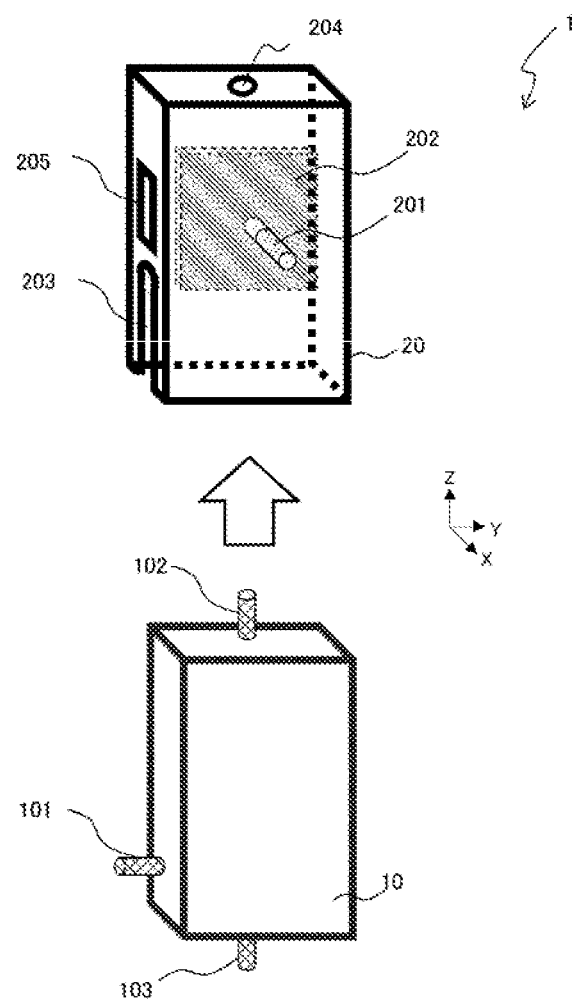
[FIG. 1]

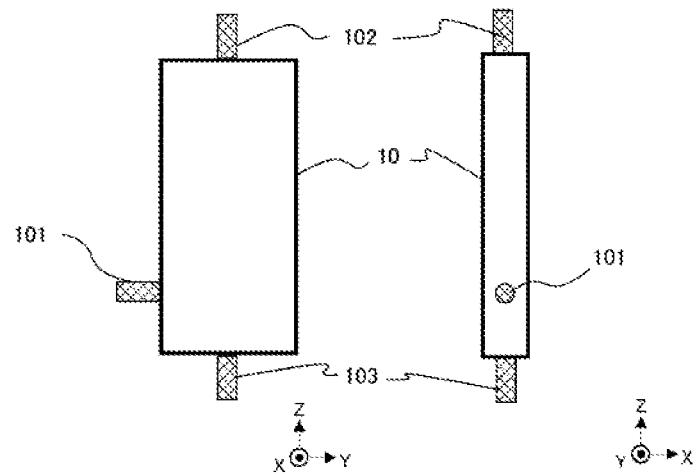
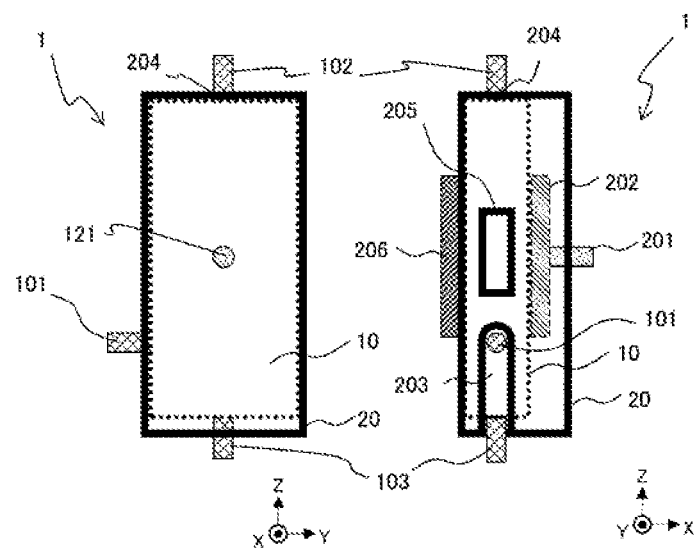

[FIG. 4]
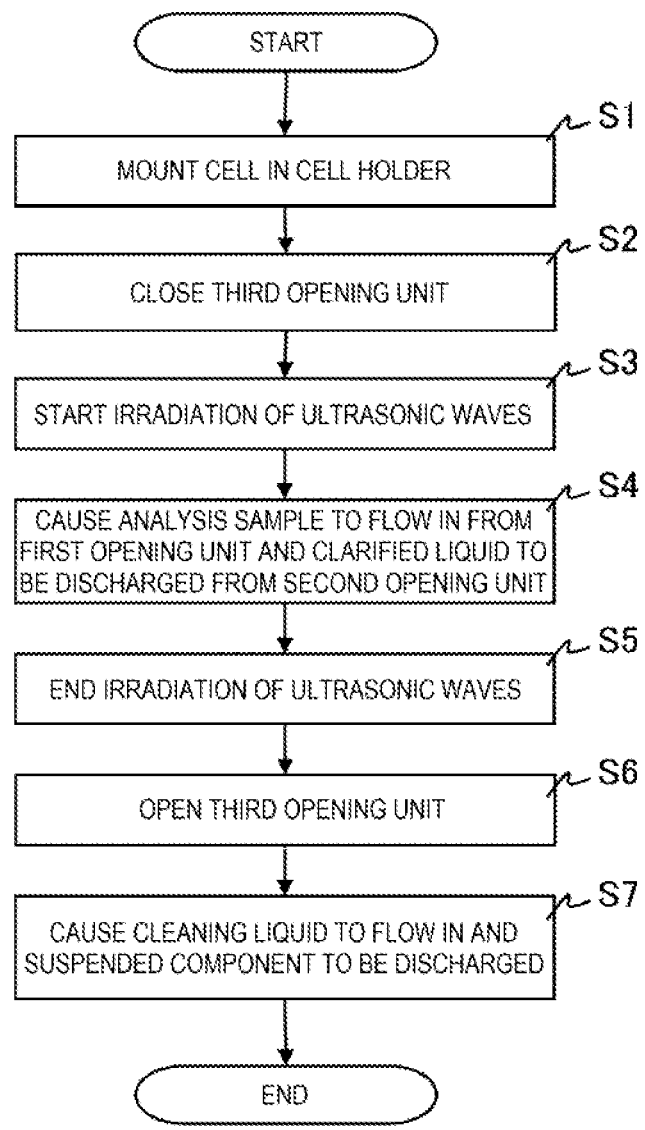

[FIG. 5]
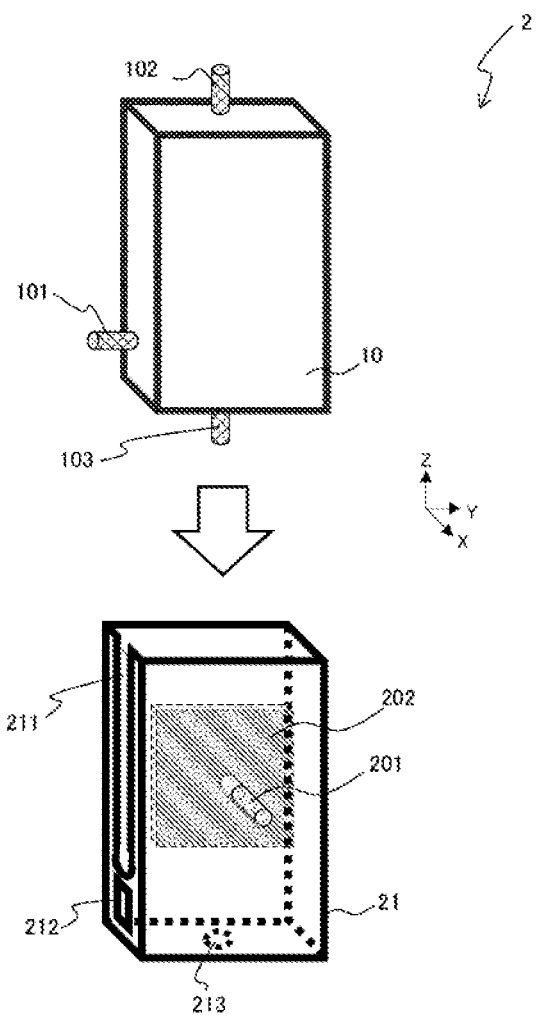

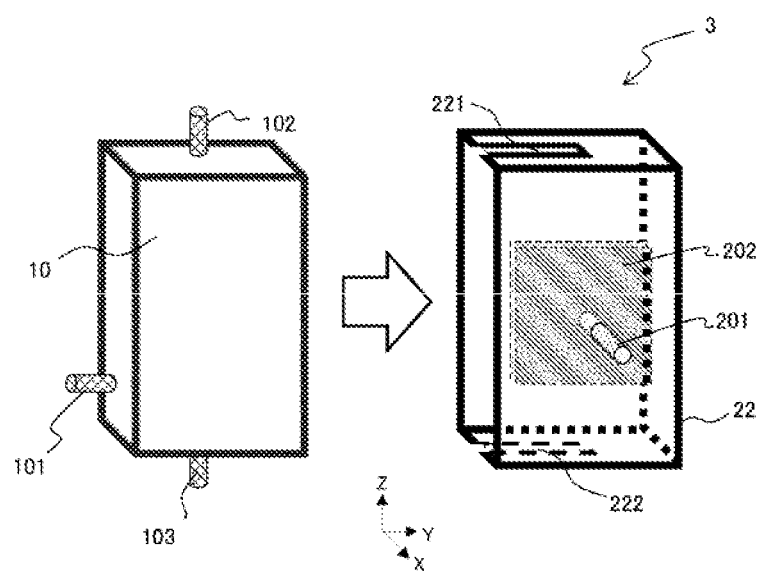
[FIG. 6]

[FIG. 7]
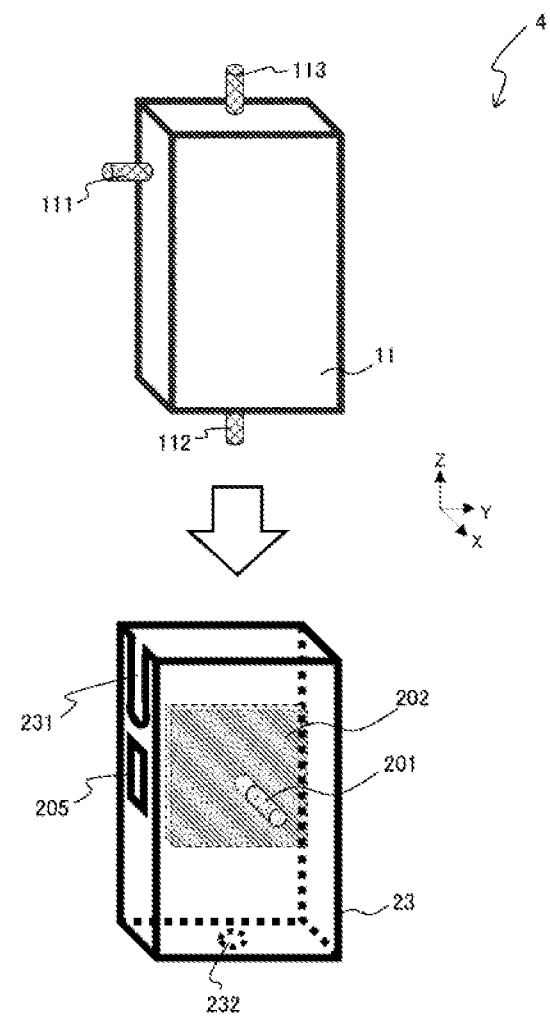

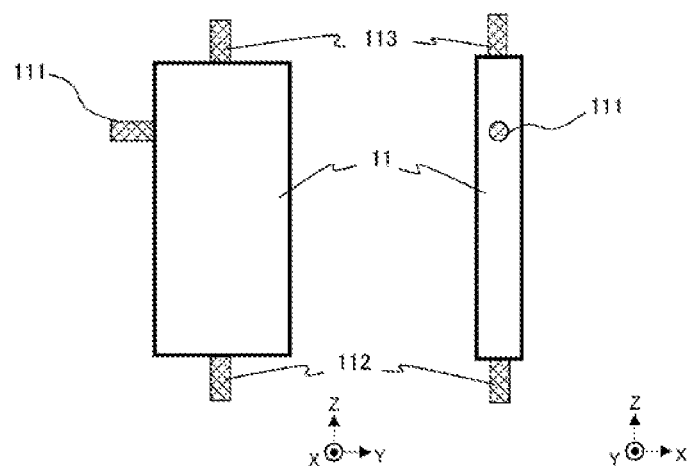
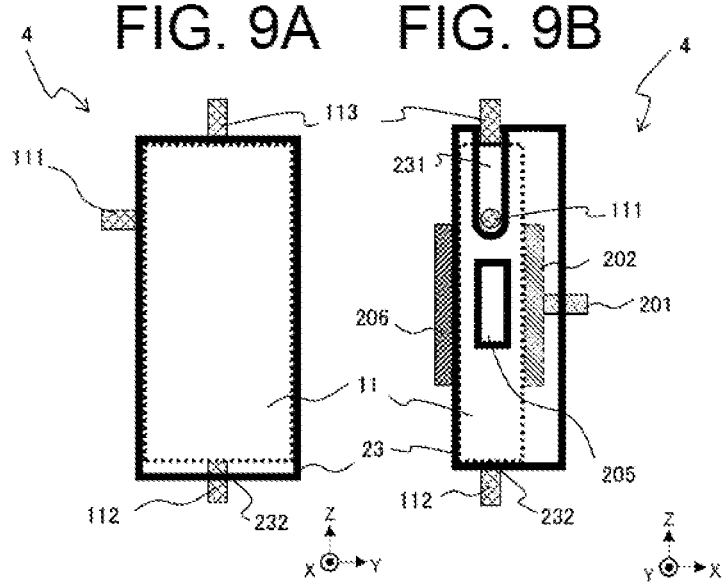

[FIG. 15]

[FIG. 16]
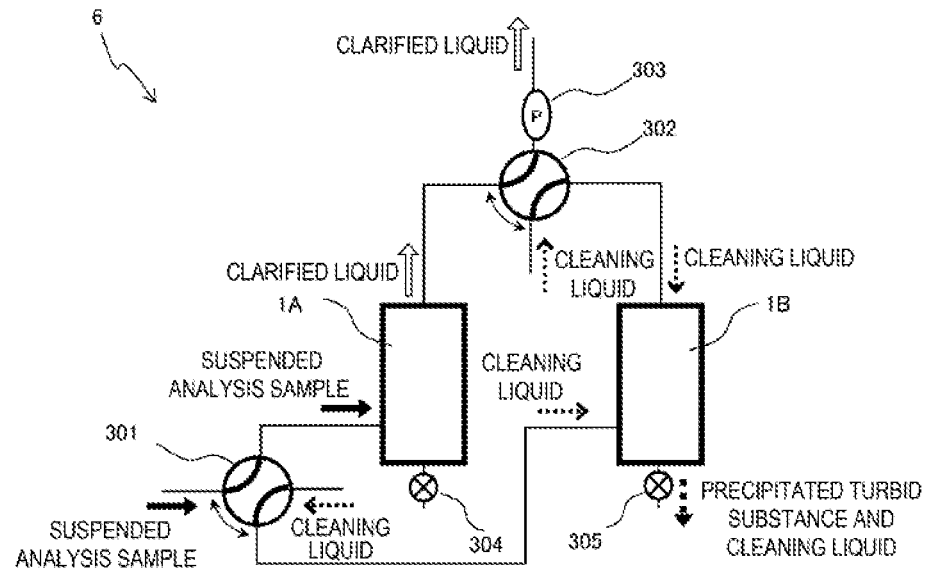
[FIG. 17]
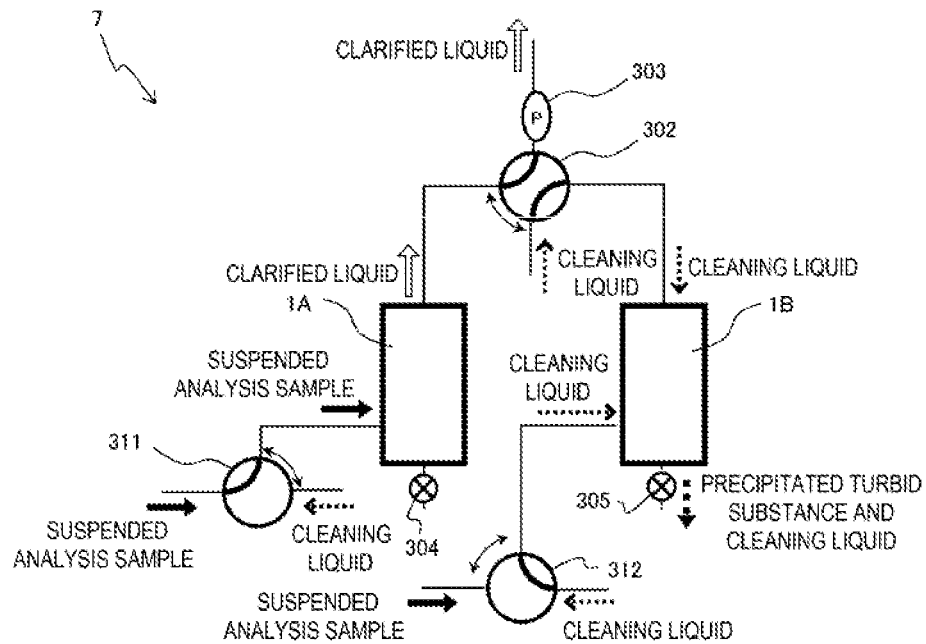

[FIG. 18]
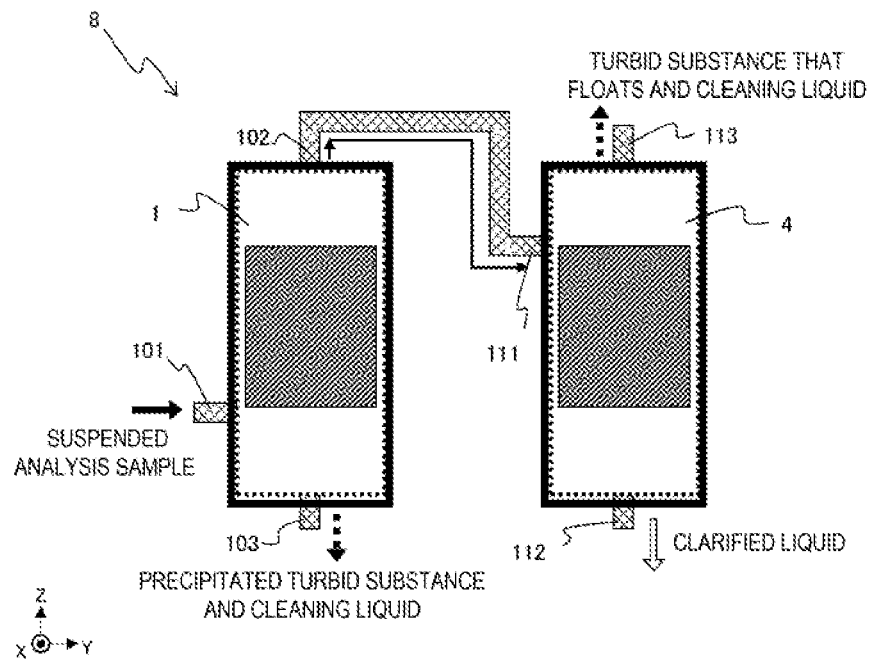
[FIG. 19]
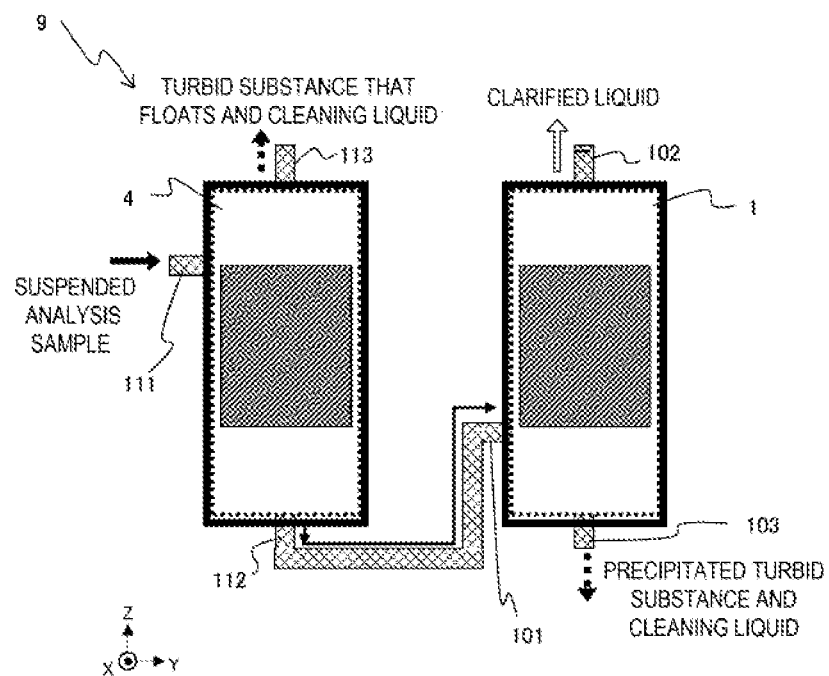

SYSTEM PROVIDING AN ULTRASONIC PRETREATMENT FOR SEPARATING PARTICLES FROM AN ANALYSIS SAMPLE

TECHNICAL FIELD

The present invention relates to an analysis sample pretreatment apparatus, an analysis sample pretreatment method, and an analysis sample pretreatment system.

BACKGROUND ART

In the related art, when a solute component in a suspension is analyzed with a liquid chromatograph or an analysis apparatus for mass spectrography or the like, a turbid substance in the suspension may cause clogging in a flow path or cause noise. Therefore, a pretreatment of separating and removing the turbid substance in the suspension before analyzing the solute component is necessary.

At present, the pretreatment is mainly performed by a manual method. Generally, the turbid substance is manually separated and removed by membrane filtration.

As a separation method other than the method using the membrane filtration, for example, PTL 1 discloses a suspension treatment apparatus. "The suspension treatment apparatus includes a suspension treatment unit configured with a flow path unit through which a suspension flows, and a driving unit configured to drive the suspension treatment unit. The suspension treatment unit is provided with two or more transducers including a first transducer and a second transducer such that a region of at least a part of the flow path unit is sandwiched. The driving unit includes a signal amplification unit, the first transducer and the second transducer are configured to be electrically connected to each other via the signal amplification unit, the signal amplification unit amplifies an electric signal from the second transducer and inputs the electric signal to the first transducer, and ultrasonic waves are generated in a region of the flow path unit between the first transducer and the second transducer, thereby performing a treatment of separating a fine particle or a solid matter from the suspension."

CITATION LIST

Patent Literature

PTL 1: WO 2015/25395

SUMMARY OF INVENTION

Technical Problem

When the pretreatment is performed by the manual method, sampling and a pretreatment of a sample are manually performed a plurality of times, and therefore time and labor cost are needed. Further, when the membrane filtration is used, time and labor of membrane replacement and a cost of purchasing a membrane that is a consumable are required.

In the treatment apparatus described in PTL 1, since the ultrasonic wave transducer is connected to a container that stores the suspension, the ultrasonic wave transducer may not be easily attached or detached when the container is replaced. Further, in the treatment apparatus and the container, there is a part in which it is difficult to discharge a precipitate of the turbid substance and wash the flow path in terms of a structure.

The invention has been made in view of such a situation, and an object thereof is to perform the pretreatment of the analysis sample containing the turbid substance rapidly and at a low cost.

Solution to Problem

The disclosure includes a plurality of units for solving at least a part of the above problems, and an example thereof is given as follows. In order to solve the above problems, according to an aspect of the invention, there is provided an analysis sample pretreatment apparatus configured to obtain a clarified liquid by removing a turbid substance from an analysis sample. The analysis sample pretreatment apparatus includes a cell configured to store the analysis sample; and a cell holder in which at least a part of a housing is opened to mount the cell. The cell holder includes an ultrasonic wave transducer and an ultrasonic wave reflection plate that are disposed on facing plane pairs while sandwiching the cell mounted inside the cell holder. The cell includes a first opening unit from which the analysis sample flows in, a second opening unit from which the clarified liquid flows out, and a third opening unit from which the turbid substance is discharged. In a state where the cell is mounted in the cell holder, the first opening unit is provided at a position lower than an upper end of the ultrasonic wave transducer in a vertical direction, or at a position higher than a lower end of the ultrasonic wave transducer in the vertical direction.

Advantageous Effect

According to the aspect of the invention, the pretreatment of the analysis sample containing the turbid substance can be performed rapidly and at a low cost.

Problems, configurations, and effects other than those described above will be clarified by the following description of embodiments.

BRIEF DESCRIPTION OF DRAWINGS

FIG. 1 is a view showing a configuration example of a cell and a cell holder 20 that constitute an analysis sample pretreatment apparatus 1 according to a first embodiment of the invention.

FIGS. 2A and 2B show the configuration example of the cell 10, FIG. 2A is a YZ side view, and FIG. 2B is an XZ side view.

FIGS. 3A and 3B show a state where the cell 10 is mounted in the cell holder 20, FIG. 3A is a YZ side view, and FIG. 3B is a XZ side view.

FIG. 4 is a flowchart illustrating a pretreatment.

FIG. 5 is a view showing a configuration example of the cell and a cell holder 21 that constitute an analysis sample pretreatment apparatus 2 according to a second embodiment of the invention.

FIG. 6 is a view showing a configuration example of the cell and a cell holder 22 that constitute an analysis sample pretreatment apparatus 3 according to a third embodiment of the invention.

FIG. 7 is a view showing a configuration example of a cell and a cell holder 23 that constitute an analysis sample pretreatment apparatus 4 according to a fourth embodiment of the invention.

FIGS. 8A and 8B show the configuration example of the cell 11, FIG. 8A is a YZ side view, and FIG. 8B is an XZ side view.

FIGS. 9A and 9B show a state where the cell 11 is mounted in the cell holder 23, FIG. 9A is a YZ side view, and FIG. 9B is an XZ side view.

FIG. 10A is a YZ side view, and FIG. 10B is an XY side view.

FIG. 11A is a YZ side view, and FIG. 11B is an XY side view.

FIG. 12A is a YZ side view, and FIG. 12B is an XY side view.

FIG. 13A is a YZ side view, and FIG. 13B is an XY side view.

FIG. 14A is a YZ side view, and FIG. 14B is an XZ side view.

FIG. 15 shows a configuration example of the cell 16 and a cell holder 24 that constitute the analysis sample pretreatment apparatus 5 according to the fifth embodiment of the invention, and is a perspective view showing a state where the cell 16 is mounted in the cell holder 24.

FIG. 16 is a view showing a configuration example of an analysis sample pretreatment system 6 according to a sixth embodiment of the invention.

FIG. 17 is a view showing a configuration example of an analysis sample pretreatment system 7 according to a seventh embodiment of the invention.

FIG. 18 is a view showing a configuration example of an analysis sample pretreatment system 8 according to an eighth embodiment of the invention.

FIG. 19 is a view showing a configuration example of an analysis sample pretreatment system 9 according to a ninth embodiment of the invention.

DESCRIPTION OF EMBODIMENTS

Figure 10A:
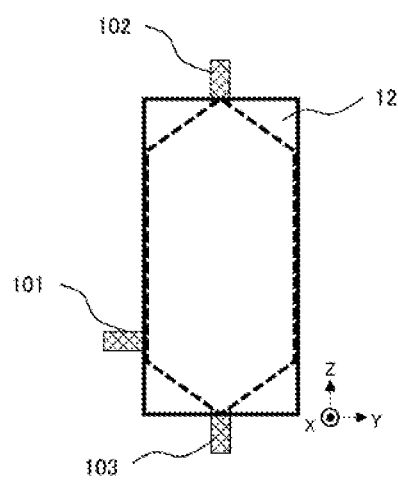
FIGS. 10A and 10B show a cell 12 that is a first modification of the cell 10.

In embodiments to be described below, descriptions will be made to a plurality of sections or embodiments when necessary for convenience. However, unless otherwise specified, these are not unrelated to one another, but one is in relations of a modification, a detail, supplementary explanation, and the like of a part or all of another. In the following embodiments, when a reference is made to the number of elements and the like (including a count, a numeric value, an amount, a range and the like), unless otherwise specified and limited theoretically apparently to a specific number and the like, the number is not limited to the specific number and may be either equal to or larger than or equal to or less than the specific number.

Further, in the following embodiments, it is needless to say that the components (also including element steps, and the like) are not always indispensable unless otherwise specified or apparently considered as indispensable in principle. Similarly, in the following embodiments, when a reference is made to a shape of the components, a positional relationship thereof, and the like, substantially approximate and similar shapes and the like are included therein unless otherwise specified or except a case where it can be thought that they are apparently excluded in principle. The same also applies to the numerical value and the range described above. Further, in all drawings illustrating the embodiments, the same members are denoted by the same reference numerals in principle, and repetitive description thereof will be omitted.

Hereinafter, embodiments of the invention will be described with reference to the accompanying drawings. In the drawings, an orthogonal coordinate system including an X axis, a Y axis, and a Z axis is used, the X axis and the Y axis indicate a horizontal direction, and the Z axis indicates a vertical direction.

<Outline of Embodiments of Invention>

An analysis sample pretreatment apparatus and an analysis sample pretreatment system according to an embodiment of the invention are disposed in a previous stage of an analysis apparatus that analyzes a solute component contained in a suspension that serves as an analysis sample. That is, in the analysis sample pretreatment apparatus and the analysis sample pretreatment system are configured to perform a pretreatment for separating and removing a turbid substance from the analysis sample containing the turbid substance, and supply a resulting clarified analysis sample (hereinafter, referred to as a clarified liquid) to an analysis apparatus.

Here, as the analysis sample, a chemical in a liquid state, a pharmaceutical, a food, an environmental sample, a suspension containing solid fine particles, an emulsion in which oil droplets are dispersed, and the like are assumed.

<Analysis Sample Pretreatment Apparatus 1 According to First Embodiment of Invention>

FIG. 1 shows a configuration example of a cell 10 and a cell holder 20 that constitute the analysis sample pretreatment apparatus 1 according to the first embodiment of the invention.

The analysis sample pretreatment apparatus 1 is suitable for a pretreatment of an analysis sample in which density of a turbid substance is larger than that of a medium component. In the analysis sample pretreatment apparatus 1, the cell 10 can be mounted in or dismounted from the cell holder 20 from below the cell holder 20.

The cell 10 stores the analysis sample containing the turbid substance. The cell holder 20 holds the mounted cell 10 and causes the cell 10 to be irradiated with ultrasonic waves, thereby separating the turbid substance from the analysis sample in the cell 10.

Next, FIG. 2 shows the configuration example of the cell 10, FIG. 2(A) shows a side view of a YZ surface, and FIG. 2(B) shows a side view of an XZ surface. FIG. 3 shows a state where the cell 10 is mounted in the cell holder 20, FIG. 3(A) shows a side view of a YZ surface, and FIG. 3(B) shows a side view of an XZ surface.

The cell 10 is formed in a rectangular parallelepiped with a material that is chemically stable and has mechanical strength and heat resistance. In order to make the analysis sample in the cell 10 visible, it is desirable to use a transparent material such as glass, an acrylic resin, a polycarbonate resin, or a fluorine resin. Further, when it is unnecessary to see the inside of the cell 10, stainless steel or the like may be used. A rectangular parallelepiped space for storing the analysis sample is formed inside the cell 10.

The cell 10 is provided with a first opening unit 101, a second opening unit 102, and a third opening unit 103. The first opening unit 101, the second opening unit 102, and the third opening unit 103 may be holes formed in a wall surface of the cell 10, and pipes may be connected to the holes.

In a state where the cell 10 is mounted in the cell holder 20, the first opening unit 101 is provided at a position lower than an upper end of an ultrasonic wave transducer 202 in the vertical direction (Z direction). In order to increase separation efficiency of the turbid substance, it is desirable that the first opening unit 101 is provided at a position lower than a lower end of the ultrasonic wave transducer 202 in the vertical direction (Z direction). The second opening unit 102 is provided at a position higher than the first opening unit 101 and the third opening unit 103 in the vertical direction (Z direction). The third opening unit 103 is provided at a position lower than the first opening unit 101 in the vertical direction (Z direction).

In this case, the first opening unit 101 is provided on one of a pair of facing XZ surfaces of the cell 10, the second opening unit 102 is provided on an upper surface of a pair of facing XY surfaces of the cell 10, and the third opening unit 103 is provided on a lower surface of the pair of facing XY surfaces. The surfaces on which the first opening unit 101, the second opening unit 102, and the third opening unit 103 are provided are not limited to examples described above.

Pipes, which are connected to tanks for the analysis sample, the clarified liquid, a cleaning liquid, the turbid substance, and the like, are respectively connected to the first opening unit 101, the second opening unit 102, and the third opening unit 103. Each of the pipes is provided with an opening-and-closing valve and a switching valve for switching the connected tanks, which are controlled by a control unit. Further, a pump (not shown) may be connected to each of the pipes.

The first opening unit 101 is used as an inflow port of the analysis sample containing the turbid substance and of the cleaning liquid. The second opening unit 102 is used as an outflow port of the clarified liquid or an inflow port of the cleaning liquid. The third opening unit 103 is used as a discharge port of the turbid substance separated from the analysis sample and of the cleaning liquid.

The cell holder 20 is a rectangular parallelepiped formed of a metal such as stainless steel or aluminum, or formed of an acrylic resin or the like, and is provided with a space for holding the cell 10 therein. Further, the lower surface of the pair of facing XY surfaces is opened such that the cell 10 can be attached to or detached from the cell holder 20 from below. It is desirable that the material of the cell holder 20 has heat resistance and high mechanical strength. Further, for the cell holder 20, it is more desirable to select a material having a low sound absorption rate and an acoustic impedance close to that of an adjacent substance in order to easily transmit the ultrasonic waves.

A pressing screw 201 is disposed on an outer side of one surface of a pair of facing YZ surfaces of the cell holder 20, and the ultrasonic wave transducer 202 is disposed on an inner side of the surface. Further, an ultrasonic wave reflection plate 206 is disposed on an outer side of the other surface of the pair of facing YZ surfaces of the cell holder 20 and at a position facing the ultrasonic wave transducer 202. The ultrasonic wave transducer 202 includes a piezoelectric ceramic element such as a PZT, a P (VDF-TrFE) element, a ZnO element, and the like. The ultrasonic wave transducer 202 outputs the ultrasonic waves having a predetermined wavelength in accordance with control from the control unit (not shown). The ultrasonic wave reflection plate 206 is formed of a metal that reflects the ultrasonic waves or the like. The ultrasonic wave reflection plate 206 reflects the ultrasonic waves that are output from the ultrasonic wave transducer 202 and propagate through the analysis sample stored in the cell 10.

The pressing screw 201 (corresponding to a pressing member of the invention) can be screwed into the cell holder 20, and the ultrasonic wave transducer 202 is held on an inner wall surface of the cell holder 20 so as to be movable in the X direction. Therefore, the pressing screw 201 is screwed into the cell holder 20, whereby the ultrasonic wave transducer 202 is moved to a side of the cell 10, and the cell 10 can be brought into close contact with the ultrasonic wave transducer 202 and a wall surface of the cell holder 20 where the ultrasonic wave reflection plate 206 is disposed outside.

Instead of the pressing screw 201, for example, a spring or the like may be used. Further, the ultrasonic wave reflection plate 206 may be disposed on an inner side of the other surface of the facing YZ surfaces of the cell holder 20 and at a position facing the ultrasonic wave transducer 202, or may be movable in the X direction. Furthermore, the arrangement of the ultrasonic wave transducer 202 and the ultrasonic wave reflection plate 206 may be switched, and the ultrasonic wave reflection plate 206 may be pressed against the cell 10 by the pressing screw 201.

A slit 203 through which the first opening unit 101 of the cell 10 passes when the cell 10 is attached to or detached from the cell holder 20 from below, and an observation window 205 for observing a state (state where the turbid substance is separated by the pretreatment, or the like) of the analysis sample in the cell 10 are formed in one surface of the pair of facing XZ surfaces of the cell holder 20. The state of the analysis sample in the cell 10 can also be observed from the slit 203.

A pipe hole 204 through which a pipe connected to the second opening unit 102 of the cell 10 passes is formed in the upper surface of the pair of facing XY surfaces of the cell holder 20.

In the analysis sample pretreatment apparatus 1, the cell 10 is mounted in the cell holder 20 from below by a user. When the pressing screw 201 is screwed in by the user, the cell 10 is sandwiched between the ultrasonic wave transducer 202 and the ultrasonic wave reflection plate 206. When the ultrasonic wave transducer 202 outputs the ultrasonic waves in this state, the ultrasonic waves are reflected by the YZ surface of the cell 10 or the ultrasonic wave reflection plate 206, and standing waves are formed in the analysis sample in the cell 10.

In order to bring the ultrasonic wave transducer 202 and the cell 10 into close contact and the cell 10 and the YZ surface of the cell holder 20 into close contact so as to increase transmission efficiency of the ultrasonic waves, it is desirable to apply a gel-shaped elastomer resin or the like to each contact surface.

In nodes of the standing waves generated in the analysis sample in the cell 10, the turbid substance in the analysis sample is collected and aggregated. When the density of the turbid substance is larger than that of the medium component, the turbid substance is precipitated as the aggregation proceeds, and accumulates at a bottom portion of the cell 10. Accordingly, the clarified liquid from which the turbid substance is separated and removed can be discharged from the second opening unit 102 provided above and be supplied to a subsequent stage. Further, the precipitated turbid substance can be discharged from the third opening unit 103 provided below.

<Pretreatment Performed by Analysis Sample Pretreatment Apparatus 1>

Next, FIG. 4 is a flowchart illustrating the pretreatment performed by the analysis sample pretreatment apparatus 1. The pretreatment is performed, for example, in accordance with a predetermined start operation from the user.

First, the user mounts the cell 10 from below the cell holder 20 (step S1). Then, predetermined pipes are connected to the first opening unit 101, the second opening unit 102, and the third opening unit 103 of the cell 10. The pipes may be connected to the first opening unit 101 and the third opening unit 103 before the cell 10 is mounted in the cell holder 20.

Next, the opening-and-closing valve of the pipe connected to the third opening unit 103 of the cell 10 closes the pipe in accordance with the control from the control unit (step S2). Next, the ultrasonic wave transducer 202 starts irradiation of the ultrasonic waves having the predetermined wavelength in accordance with the control from the control unit (not shown) (step S3).

Next, the opening-and-closing valve of the pipe connected to the first opening unit 101 of the cell 10 opens the pipe and causes the analysis sample containing the turbid substance to flow into the cell 10 in accordance with the control from the control unit. At the same time, the opening-and-closing valve of the pipe connected to the second opening unit 102 opens the pipe in accordance with the control from the control unit (step S4).

Accordingly, the standing waves of the ultrasonic waves are generated in the analysis sample that flows into the cell 10, the turbid substance aggregates in the nodes thereof, and the aggregated turbid substance is precipitated at the bottom portion of the cell 10. Therefore, the clarified liquid from which the turbid substance is separated and removed is discharged from the opened second opening unit 102. The clarified liquid is supplied to the analysis apparatus (not shown) disposed at the subsequent stage of the analysis sample pretreatment apparatus.

Next, the opening-and-closing valve of the pipe connected to the first opening unit 101 of the cell 10 closes the pipe in accordance with the control from the control unit. Accordingly, after the inflow of the analysis sample containing the turbid substance to the cell 10 is stopped, the ultrasonic wave transducer 202 ends the irradiation of the ultrasonic waves having the predetermined wavelength in accordance with the control from the control unit (step S5). A control timing of the control unit in step S5 may be performed after predetermined time elapses since the irradiation of the ultrasonic waves is started in step S3, or may be performed in accordance with an instruction from the user who confirms that the turbid substance has accumulated at the bottom portion of the cell 10 by visual observation from the observation window 205.

Next, the opening-and-closing valve of the pipe connected to the third opening unit 103 of the cell 10 opens the pipe in accordance with the control from the control unit (step S6). Next, the control unit switches the switching valve of the pipe connected to at least one of the first opening unit 101 and the second opening unit 102 to the tank of the cleaning liquid, opens an opening valve, and causes the cleaning liquid to flow into the cell 10 (step S7). Accordingly, the turbid substance precipitated at the bottom portion of the cell 10 is discharged from the third opening unit 103 together with the cleaning liquid. This is the end of the description of the pretreatment performed by the analysis sample pretreatment apparatus 1.

As described above, according to the analysis sample pretreatment apparatus 1, the turbid substance can be continuously removed and separated from the analysis sample containing the turbid substance that has the density larger than that of the medium component. Further, since a filter or the like that filters the turbid substance is not used, the pretreatment can be performed at a low cost compared with a case of using the filter or the like.

Further, since the inside of the cell 10 can be cleaned without dismounting the cell 10 from the cell holder 20, the next pretreatment can be rapidly started. In this case, step S1 may be omitted, and the pretreatment may be started from step S2.

<Analysis Sample Pretreatment Apparatus 2 According to Second Embodiment of Invention>

Next, FIG. 5 shows a configuration example of the cell 10 and a cell holder 21 that constitute the analysis sample pretreatment apparatus 2 according to the second embodiment of the invention.

The analysis sample pretreatment apparatus 2 is, similar to the analysis sample pretreatment apparatus 1, suitable for a pretreatment of an analysis sample in which density of a turbid substance is larger than that of a medium component. The analysis sample pretreatment apparatus 2 uses the cell 10 common to the analysis sample pretreatment apparatus 1, and replaces the cell holder 20 in the analysis sample pretreatment apparatus 1 with the cell holder 21.

In the analysis sample pretreatment apparatus 2, the cell 10 can be mounted in or dismounted from the cell holder 21 from above the cell holder 21.

The cell holder 21 is a rectangular parallelepiped formed of the same material as that of the cell holder 20. An upper surface of facing XY surfaces is opened such that the cell 10 can be attached to or detached from the cell holder 21 from above.

The cell holder 21 is provided with the pressing screw 201, the ultrasonic wave transducer 202, and the ultrasonic wave reflection plate 206 at positions similar to those of the cell holder 20. Description thereof will be omitted.

A slit 211 through which the first opening unit 101 of the cell 10 passes when the cell 10 is attached to or detached from the cell holder 20 from above, and an observation window 212 for observing a state of the analysis sample in the cell 10 are formed in one surface of the pair of facing XZ surfaces of the cell holder 20. The state of the analysis sample in the cell 10 can also be observed from the slit 211.

A pipe hole 213 through which a pipe connected to the third opening unit 103 of the cell 10 passes is formed in a lower surface of the pair of facing XY surfaces of the cell holder 21.

Since a pretreatment performed by the analysis sample pretreatment apparatus 2 is similar to that performed by the analysis sample pretreatment apparatus 1, description thereof will be omitted.

According to the analysis sample pretreatment apparatus 2, an effect similar to that of the analysis sample pretreatment apparatus 1 can be obtained. Further, according to the analysis sample pretreatment apparatus 2, a state of a bottom portion of the cell 10 (accumulation of the turbid substance, and the like) can be observed via the observation window 212.

<Analysis Sample Pretreatment Apparatus 3 According to Third Embodiment of Invention>

Next, FIG. 6 shows a configuration example of the cell 10 and a cell holder 22 that constitute the analysis sample pretreatment apparatus 3 according to the third embodiment of the invention.

The analysis sample pretreatment apparatus 3 is, similar to the analysis sample pretreatment apparatus 1, suitable for a pretreatment of an analysis sample in which density of a turbid substance is larger than that of a medium component. The analysis sample pretreatment apparatus 3 uses the cell 10 common to the analysis sample pretreatment apparatus 1, and replaces the cell holder 20 in the analysis sample pretreatment apparatus 1 with the cell holder 22.

In the analysis sample pretreatment apparatus 3, the cell 10 can be mounted in or dismounted from the cell holder 22 from a side.

The cell holder 22 is a rectangular parallelepiped formed of the same material as that of the cell holder 20. One surface of the pair of facing XZ surfaces of the cell holder 22 is opened such that the cell 10 can be attached to or detached from the cell holder 22 from the side.

The cell holder 22 is provided with the pressing screw 201, the ultrasonic wave transducer 202, and the ultrasonic wave reflection plate 206 at positions similar to those of the cell holder 20. Description thereof will be omitted.

A slit 221 through which the second opening unit 102 of the cell 10 passes when the cell 10 is attached to or detached from the cell holder 22 from the side is formed in an upper surface of the pair of facing XY surfaces of the cell holder 22. Further, a slit 222 through which the third opening unit 103 of the cell 10 passes when the cell 10 is attached to or detached from the cell holder 22 from the side is formed in a lower surface of the pair of facing XY surfaces. In the case of the cell holder 22, a state of the analysis sample in the cell 10 can be observed from the open XZ surface.

Since a pretreatment performed by the analysis sample pretreatment apparatus 3 is similar to that performed by the analysis sample pretreatment apparatus 1, description thereof will be omitted.

According to the analysis sample pretreatment apparatus 3, an effect similar to that of the analysis sample pretreatment apparatus 1 can be obtained.

Further, according to the analysis sample pretreatment apparatus 3, the cell 10 can be attached to or detached from the cell holder 22 without dismounting the connected pipe from any of the first opening unit 101, the second opening unit 102, and the third opening unit 103. Therefore, the analysis sample pretreatment apparatus 3 is suitable for use when, for example, sterilization is performed in a state where each pipe is connected to the cell 10, and each pipe cannot be removed from the cell 10 in order to prevent contamination after the sterilization as in a case of using a culture solution of cells, microorganisms or the like as the analysis sample.

<Analysis Sample Pretreatment Apparatus 4 According to Fourth Embodiment of Invention>

Next, FIG. 7 shows a configuration example of a cell 11 and a cell holder 23 that constitute the analysis sample pretreatment apparatus 4 according to the fourth embodiment of the invention.

The analysis sample pretreatment apparatus 4 is suitable for a pretreatment of an analysis sample in which density of a turbid substance is smaller than that of a medium component. Specifically, the analysis sample pretreatment apparatus 4 is suitable for a pretreatment of an aqueous solution that contains solid fine particles having density smaller than that of water (medium component), such as polyethylene, polypropylene, and wood pieces, of an emulsion in which oil droplets are dispersed in water, and of the like. In the analysis sample pretreatment apparatus 4, the cell 11 can be mounted in or dismounted from the cell holder 23 from above.

The cell 11 stores the analysis sample containing the turbid substance. The cell holder 23 holds the mounted cell 11 and causes the cell 11 to be irradiated with ultrasonic waves, thereby separating the turbid substance from the analysis sample in the cell 11.

Next, FIG. 8 shows the configuration example of the cell 11, FIG. 8(A) shows a side view of a YZ surface, and FIG. 8(B) shows a side view of an XZ surface.

The cell 11 is formed in a rectangular parallelepiped with a material similar to that of the cell 10. A rectangular parallelepiped space for storing the analysis sample is formed inside the cell 11.

The cell 11 is provided with a first opening unit 111, a second opening unit 112, and a third opening unit 113. The first opening unit 111, the second opening unit 112, and the third opening unit 113 may be holes formed in a wall surface of the cell 11, and pipes may be connected to the holes.

In a state where the cell 11 is mounted in the cell holder 23, the first opening unit 111 is provided at a position higher than a lower end of the ultrasonic wave transducer 202 in the vertical direction (Z direction). In order to increase separation efficiency of the turbid substance, it is desirable that the first opening unit 111 is provided at a position higher than an upper end of the ultrasonic wave transducer 202 in the vertical direction (Z direction). The second opening unit 112 is provided at a position lower than the first opening unit 111 and the third opening unit 113 in the vertical direction (Z direction). The third opening unit 113 is provided at a position higher than the first opening unit 111 in the vertical direction (Z direction).

In this case, the first opening unit 111 is provided on one surface of the pair of facing XZ surfaces of the cell 11, the second opening unit 112 is provided on a lower surface of the pair of facing XY surfaces of the cell 11, and the third opening unit 113 is provided on an upper surface of the pair of facing XY surfaces. The surfaces on which the first opening unit 111, the second opening unit 112, and the third opening unit 113 are provided are not limited to those described above.

Pipes, which are connected to tanks for the analysis sample, a clarified liquid, a cleaning liquid, the turbid substance, and the like, are respectively connected to the first opening unit 111, the second opening unit 112 and the third opening unit 113. Each of the pipes is provided with an opening-and-closing valve and a switching valve for switching the connected tanks, which are controlled by a control unit. Further, a pump (not shown) may be connected to each of the pipes.

The first opening unit 111 is used as an inflow port of the analysis sample containing the turbid substance and of the cleaning liquid. The second opening unit 112 is used as an outflow port of the clarified liquid from which the turbid substance is removed, or as an inlet of the cleaning liquid. The third opening unit 113 is used as a discharge port of the turbid substance separated from the analysis sample and of the cleaning liquid.

Next, FIG. 9 shows a state where the cell 11 is mounted in the cell holder 23, FIG. 9(A) shows a side view of a YZ surface, and FIG. 9(B) shows a side view of an XZ surface.

The cell holder 23 is a rectangular parallelepiped formed of a material similar to that of the cell holder 20, and is provided with a space for holding the cell 11 therein. An upper surface of the pair of facing XY surfaces is opened such that the cell 11 can be attached to or detached from the cell holder 23 from above.

The cell holder 23 is provided with the pressing screw 201, the ultrasonic wave transducer 202, and the ultrasonic wave reflection plate 206 at positions similar to those of the cell holder 20. Description thereof will be omitted.

A slit 231 through which the first opening unit 111 of the cell 11 passes when the cell 11 is attached to or detached from the cell holder 23 from above, and an observation window 205 for observing a state of the analysis sample in the cell 11 are formed in one surface of the pair of facing XZ surfaces of the cell holder 23. The state of the analysis sample in the cell 10 can also be observed from the slit 231.

A pipe hole 232 through which a pipe connected to the second opening unit 112 of the cell 11 passes is formed in a lower surface of the pair of facing XY surfaces of the cell holder 23.

In the analysis sample pretreatment apparatus 4, when density of the turbid substance in the analysis sample is smaller than that of a medium component, the turbid substance floats as aggregation proceeds, and accumulates at an upper portion of the cell 10. Accordingly, the clarified liquid from which the turbid substance is separated and removed can be discharged from the second opening unit 112 provided below and supplied to a subsequent stage. Further, the turbid substance that floats can be discharged from the third opening unit 113 provided above.

Since a pretreatment performed by the analysis sample pretreatment apparatus 4 is similar to that performed by the analysis sample pretreatment apparatus 1, description thereof will be omitted.

According to the analysis sample pretreatment apparatus 4, the turbid substance can be continuously removed and separated from the analysis sample containing the turbid substance having the density smaller than that of the medium component. Further, since a filter or the like that filters the turbid substance is not used, the pretreatment can be performed at a low cost compared with a case of using the filter or the like.

Further, since inside of the cell 11 can be cleaned without dismounting the cell 11 from the cell holder 23, the next pretreatment can be rapidly started.

Although the cell 11 can be attached to or detached from the cell holder 23 from above, the cell 11 may be formed to be attachable to or detachable from the cell holder 23 from a side or from below as the cases of the cell holders 20 and 23.

<Modifications of Cell 10>

Next, the modifications of the cell 10 will be described.

Figure 10B:
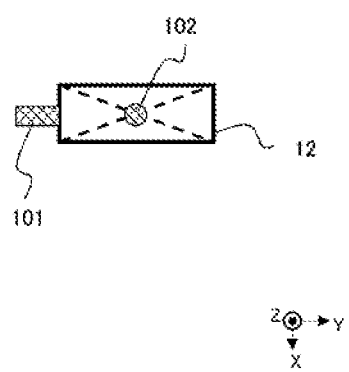

FIG. 10 shows a cell 12 that is the first modification of the cell 10, FIG. 10(A) is a YZ plan view, and FIG. 10(B) is an XY plan view.

An external shape of the cell 12 is formed to be similar to that of the cell 10 (FIG. 2). The cell 12 is provided with the first opening unit 101, the second opening unit 102, and the third opening unit 103 at the same positions as those of the cell 10. Therefore, the cell 12 can be mounted in the cell holder 20 (FIG. 3), the cell holder 21 (FIG. 5), and the cell holder 22 (FIG. 6).

Although not shown, if the first opening unit 111, the second opening unit 112, and the third opening unit 113 are provided at the same positions as those of the cell 11 (FIG. 8) instead of providing the first opening unit 101, the second opening unit 102, and the third opening unit 103 in the cell 12, the cell 12 can be mounted in the cell holder 23 (FIG. 7).

An internal space for storing the analysis sample is formed in the cell 12, and at least one of an upper portion and a lower portion (both in the case shown in this figure) of the internal space is formed in a quadrangular pyramid shape. The second opening unit 102 coincides with a vertex of the quadrangular pyramid shape formed at the upper portion of the internal space. The third opening unit 103 coincides with a vertex of the quadrangular pyramid shape formed at the lower portion of the internal space.

Accordingly, the upper portion of the internal space of the cell 12 is formed in the quadrangular pyramid shape, whereby a turbid substance that floats and a bubble mixed in the cell 10 can be easily discharged from the cell 12. Further, the lower portion of the internal space is formed in the quadrangular pyramid shape, whereby a precipitated turbid substance can be easily discharged from the cell 12. Furthermore, retention of a clarified liquid and a cleaning liquid that are inside the cell 12 can be prevented.

Figure 11A:
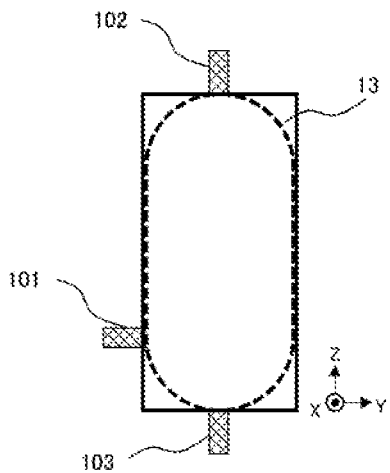
FIGS. 11A and 11B show a cell 13 that is a second modification of the cell 10.
Figure 11B:
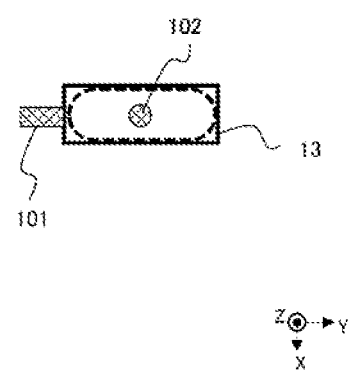

Next, FIG. 11 shows a cell 13 that is the second modification of the cell 10, FIG. 11(A) is a YZ plan view, and FIG. 11(B) is an XY plan view.

An external shape of the cell 13 is formed to be similar to that of the cell 10. The cell 13 is provided with the first opening unit 101, the second opening unit 102, and the third opening unit 103 at the same positions as those of the cell 10. Therefore, the cell 13 can be mounted in the cell holder 20 (FIG. 3), the cell holder 21 (FIG. 5), and the cell holder 22 (FIG. 6).

Although not shown, if the first opening unit 111, the second opening unit 112, and the third opening unit 113 are provided at the same positions as those of the cell 11 (FIG. 8) instead of providing the first opening unit 101, the second opening unit 102, and the third opening unit 103 in the cell 13, the cell 13 can be mounted in the cell holder 23 (FIG. 7).

An internal space for storing the analysis sample is formed in the cell 13, and at least one of an upper portion and a lower portion of the internal space (both in the case shown in this figure) is formed in a hemispherical shape, a conical shape, or a rotating paraboloid shape. The second opening unit 102 coincides with a vertex of the hemispherical shape or the like formed at the upper portion of the internal space. The third opening unit 103 coincides with a vertex of the hemispherical shape or the like formed at the lower portion of the internal space.

The cell 13 formed in this manner can obtain an effect similar to that of the cell 12 described above.

Figure 12A:
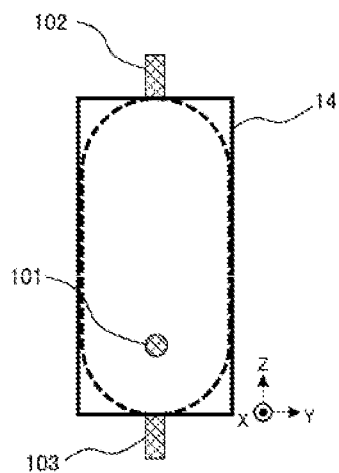
FIGS. 12A and 12B show a cell 14 that is a third modification of the cell 10.
Figure 12B:
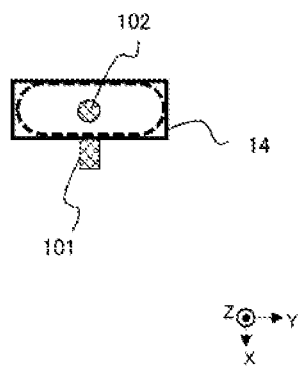

Next, FIG. 12 shows a cell 14 that is the third modification of the cell 10, FIG. 12(A) is a YZ plan view, and FIG. 12(B) is an XY plan view.

The cell 14 is obtained by moving a position of the first opening unit 101 in the cell 13 (FIG. 11) from an XZ surface to a YZ surface with the same height (the same Z coordinate).

The cell 14 formed in this manner can obtain an effect similar to those of the cells 12 and 13 described above. However, since the position of the first opening unit 101 of the cell 14 is different from that of the cell 10, a slit or the like maybe formed in the YZ surface of the cell holder in which the cell 14 is mounted so as to correspond to the first opening unit 101 provided on the YZ surface of the cell 14.

Figure 13A:
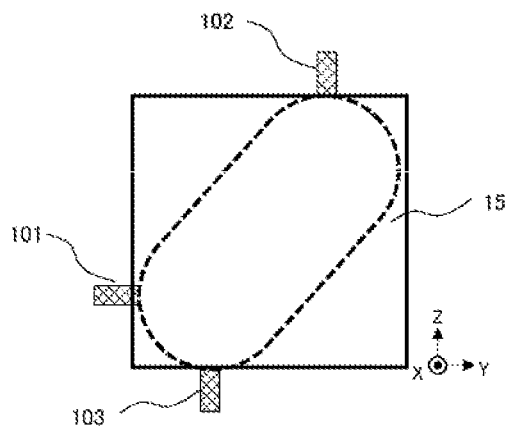
FIGS. 13A and 13B show a cell 15 that is a fourth embodiment of the cell 10.
Figure 13B:
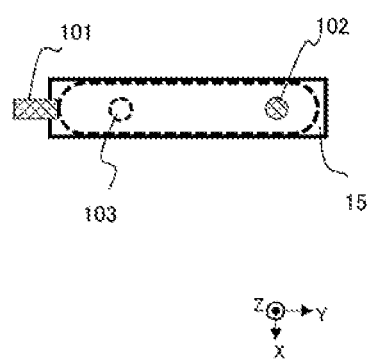

Next, FIG. 13 shows a cell 15 that is the fourth modification of the cell 10, FIG. 13(A) is a YZ plan view, and FIG. 13(B) is an XY plan view.

In the cell 15, an internal space for storing an analysis sample is formed obliquely with respect to an external shape. Then, at least one of an upper portion and a lower portion of the internal space (both in the case shown in this figure) is formed in a hemispherical shape, a conical shape, or a rotating paraboloid shape. The second opening unit 102 coincides with a vertex of the hemispherical shape or the like formed at the upper portion of the internal space. The third opening unit 103 coincides with a vertex of the hemispherical shape or the like formed at the lower portion of the internal space.

The cell 15 formed in this manner can obtain an effect similar to those of the cells 12 to 14 described above. However, the cell holder in which the cell 15 is mounted has a space in which the cell 15 can be mounted, and slits or through holes corresponding to the first opening unit 101, the second opening unit 102, and the third opening unit 103 of the cell 15 need to be formed.

<Analysis Sample Pretreatment Apparatus 5 According to Fifth Embodiment of Invention>

Figure 14A:
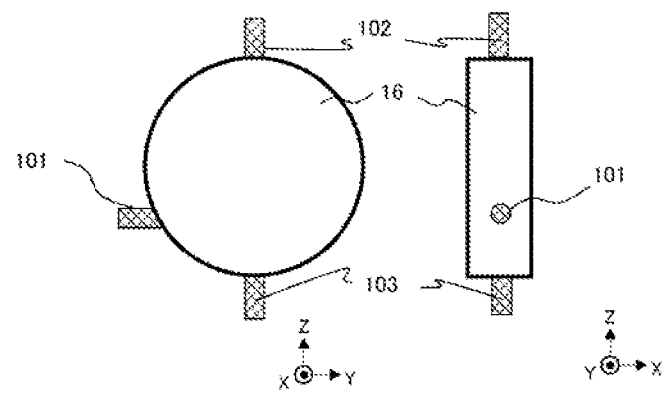
FIGS. 14A and 14B show a configuration example of a cell 16 of an analysis sample pretreatment apparatus 5 according to a fifth embodiment of the invention.
Figure 14B:
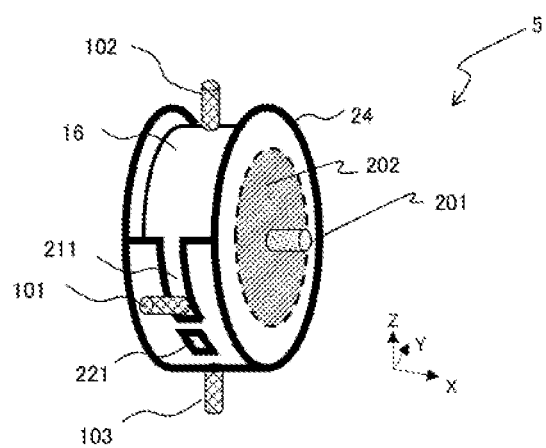

Next, FIG. 14 shows a cell 16 that constitutes the analysis sample pretreatment apparatus 5 and the cell 16 in a cell holder 24 according to the fifth embodiment of the invention, FIG. 14 (A) is a YZ plan view, and FIG. 14 (B) is an XY plan view. FIG. 15 shows a state where the cell 16 is mounted in the cell holder 24 corresponding to the cell 16 from above.

The cell 16 is formed of a material similar to that of the cell 10 into a columnar shape having the pair of XZ surfaces. In the cell 16, an internal space that stores an analysis sample and has the same shape as the external shape is formed. The cell 16, similar to the cell 10, is provided with the first opening unit 101 at a position lower than an upper end of the ultrasonic wave transducer 202 (FIG. 15) in the vertical direction (Z direction). In order to increase separation efficiency of a turbid substance, it is desirable that the first opening unit 101 is provided at a position lower than a lower end of the ultrasonic wave transducer 202 in the vertical direction (Z direction). The second opening unit 102 is provided at a position higher than the first opening unit 101 and the third opening unit 103 in the vertical direction (Z direction). The third opening unit 103 is provided at a position lower than the first opening unit 101 and the second opening unit 102 in the vertical direction (Z direction).

Similar to the cell holder 20 (FIG. 3) and the cell holder 21 (FIG. 5) having different external shapes, the cell holder 24 includes the pressing screw 201, the ultrasonic wave transducer 202, the ultrasonic wave reflection plate 206, the slit 211, and the observation window 212. The cell 16 can be mounted in and dismounted from the cell holder 24 from above.

Similar to the cell holder 20 (FIG. 1) and the cell holder 22 (FIG. 6), the cell holder 24 may be formed such that the cell 16 can be mounted from a side or from below.

Since a pretreatment performed by the analysis sample pretreatment apparatus 5 is similar to that performed by the analysis sample pretreatment apparatus 1, description thereof will be omitted.

According to the analysis sample pretreatment apparatus 5, an effect similar to that of the analysis sample pretreatment apparatus 1 can be obtained. Further, according to the analysis sample pretreatment apparatus 5, a state of a bottom portion of the cell 16 (accumulation of the turbid substance, and the like) can be observed via the observation window 212. Further, since an upper portion and the bottom portion of a lower portion of the cell 16 are formed as curved surfaces, retention of the analysis sample, a cleaning liquid, and the turbid substance inside the cell 16 can be prevented. Further, according to the analysis sample pretreatment apparatus 5, since an upper surface of the cell holder 24 is opened in a curved surface shape, compared with the case where the cell and the cell holder are rectangular parallelepipeds, the cell 16 can be easily mounted in the cell holder 24. In other words, there is a merit that a degree of freedom of a position during insertion of the cell 16 into the cell holder 24 is high.

<Analysis Sample Pretreatment System 6 According to Sixth Embodiment of Invention>

Next, FIG. 16 shows a configuration example of the analysis sample pretreatment system 6 according to the sixth embodiment of the invention.

The analysis sample pretreatment system 6 continuously supplies a clarified liquid to an analysis apparatus of a subsequent stage. A plurality of analysis sample pretreatment apparatuses 1 (FIG. 3) are arranged in parallel. The analysis sample pretreatment system 6 is suitable for a pretreatment of an analysis sample in which density of a turbid substance is larger than that of a medium component.

In the case of FIG. 16, the analysis sample pretreatment system 6 includes two analysis sample pretreatment apparatuses 1A and 1B, switching valves 301 and 302, a pump 303, and opening-and-closing valves 304 and 305.

The switching valves 301 and 302, and the opening-and-closing valves 304 and 305 can separately switch between a first state and a second state in accordance with control from the control unit (not shown).

The switching valve 301 is connected to the first opening units 101 of the analysis sample pretreatment apparatuses 1A and 1B via pipes. In the first state (state shown in the figure), the switching valve 301 supplies the analysis sample containing the turbid substance before the pretreatment to the first opening unit 101 of the analysis sample pretreatment apparatus 1A, and simultaneously supplies a cleaning liquid to the first opening unit 101 of the analysis sample pretreatment apparatus 1B. Further, in the second state (state not shown in the figure), the switching valve 301 supplies the analysis sample containing the turbid substance before the pretreatment to the first opening unit 101 of the analysis sample pretreatment apparatus 1B, and simultaneously supplies the cleaning liquid to the first opening unit 101 of the analysis sample pretreatment apparatus 1A.

The switching valve 302 is connected to the second opening units 102 of the analysis sample pretreatment apparatuses 1A and 1B via pipes. In the first state (state shown in the figure), the switching valve 302 connects the second opening unit 102 of the analysis sample pretreatment apparatus 1A to the pump 303, and simultaneously supplies the cleaning liquid to the second opening unit 102 of the analysis sample pretreatment apparatus 1B. Further, in the second state (state not shown in the figure), the switching valve 302 connects the second opening unit 102 of the analysis sample pretreatment apparatus 1B to the pump 303, and simultaneously supplies the cleaning liquid to the second opening unit 102 of the analysis sample pretreatment apparatus 1A.

The pump 303 suctions the clarified liquid obtained as a result of the pretreatment from the second opening unit 102 of the analysis sample pretreatment apparatus 1A or 1B connected via the switching valve 302, and supplies the clarified liquid to the analysis apparatus of the subsequent stage (not shown).

The opening-and-closing valve 304 is closed in the first state and opened in the second state. On the contrary, the opening-and-closing valve 305 is opened in the first state and closed in the second state.

In the analysis sample pretreatment system 6 configured as described above, when the first state and the second state are alternately repeated, the clarified liquid can be continuously supplied to the analysis apparatus of the subsequent stage, and inside of the cells 10 of the analysis sample pretreatment apparatuses 1A and 1B can also be cleaned alternately.

The analysis sample pretreatment apparatus 1 in the analysis sample pretreatment system 6 may be replaced with the analysis sample pretreatment apparatus 2 or the analysis sample pretreatment apparatus 3.

If the analysis sample pretreatment apparatus 1 in the analysis sample pretreatment system 6 is replaced with the analysis sample pretreatment apparatus 4, the analysis sample pretreatment system 6 can be changed to one suitable for a pretreatment of an analysis sample in which the density of the turbid substance is smaller than that of the medium component.

<Analysis Sample Pretreatment System 7 According to Seventh Embodiment of Invention>

Next, FIG. 17 shows a configuration example of the analysis sample pretreatment system 7 according to the seventh embodiment of the invention.

The analysis sample pretreatment system 7 continuously supplies a clarified liquid to an analysis apparatus of a subsequent stage. The analysis sample pretreatment system 6 is suitable for a pretreatment of an analysis sample in which density of a turbid substance is larger than that of a medium component.

The analysis sample pretreatment system 7 is obtained by deleting the switching valve 301 in the analysis sample pretreatment system 6 and adding switching valves 311 and 312.

The switching valves 311 and 312, and the opening-and-closing valves 304 and 305 of the analysis sample pretreatment system 7 can separately switch between a first state and a second state in accordance with control from the control unit (not shown).

The switching valve 311 is connected to the first opening unit 101 of the analysis sample pretreatment apparatus 1A via a pipe. In the first state (state shown in the figure), the switching valve 311 supplies the analysis sample containing the turbid substance before the pretreatment to the first opening unit 101 of the analysis sample pretreatment apparatus 1A. Further, in the second state (state not shown in the figure), the switching valve 311 supplies a cleaning liquid to the first opening unit 101 of the analysis sample pretreatment apparatus 1A.

The switching valve 312 is connected to the first opening unit 101 of the analysis sample pretreatment apparatus 1B via a pipe. In the first state (state shown in the figure), the switching valve 312 supplies the analysis sample containing the turbid substance before the pretreatment to the first opening unit 101 of the analysis sample pretreatment apparatus 1B. Further, in the second state (state not shown in the figure), the switching valve 312 supplies the cleaning liquid to the first opening unit 101 of the analysis sample pretreatment apparatus 1B.

The analysis sample containing the turbid substance supplied to the switching valve 311 and the analysis sample containing the turbid substance supplied to the switching valve 312 may be the same (for example, those stored in a common tank) or different ones (for example, those having different concentrations of the turbid substances).

In the analysis sample pretreatment system 7 configured as described above, when the first state and the second state are alternately repeated, the clarified liquid can be continuously supplied to the analysis apparatus of the subsequent stage, and inside of the cells 10 of the analysis sample pretreatment apparatuses 1A and 1B can also be cleaned alternately.

The analysis sample pretreatment apparatus 1 in the analysis sample pretreatment system 7 may be replaced with the analysis sample pretreatment apparatus 2 or the analysis sample pretreatment apparatus 3.

If the analysis sample pretreatment apparatus 1 in the analysis sample pretreatment system 7 is replaced with the analysis sample pretreatment apparatus 4 (FIG. 9), the analysis sample pretreatment system 7 can be changed to one suitable for a pretreatment of an analysis sample in which the density of the turbid substance is smaller than that of the medium component.

<Analysis Sample Pretreatment System 8 According to Eighth Embodiment of Invention>

Next, FIG. 18 shows a configuration example of the analysis sample pretreatment system 8 according to the eighth embodiment of the invention.

The analysis sample pretreatment system 8 supplies a clarified liquid to an analysis apparatus of a subsequent stage (not shown). The analysis sample pretreatment system 8 is suitable for a pretreatment of an analysis sample containing both a turbid substance having density larger than that of a medium component and a turbid substance having density smaller than that of the medium component.

The analysis sample pretreatment system 8 includes the analysis sample pretreatment apparatus 1 (FIG. 3) (corresponding to a first analysis sample pretreatment apparatus of the invention) and the analysis sample pretreatment apparatus 4 (FIG. 9) (corresponding to a second analysis sample pretreatment apparatus of the invention), and the second opening unit 102 of the analysis sample pretreatment apparatus 1 is connected to the first opening unit 111 of the analysis sample pretreatment apparatus 4 by a pipe.

In the analysis sample pretreatment system 8, the analysis sample containing the turbid substance is input from the first opening unit 101 of the analysis sample pretreatment apparatus 1. In the analysis sample pretreatment apparatus 1, the turbid substance having the density larger than that of the medium component is separated and removed by the pretreatment, a resultant supernatant analysis sample is output from the second opening unit 102 of the analysis sample pretreatment apparatus 1, and the obtained analysis sample is supplied to the first opening unit 111 of the analysis sample pretreatment apparatus 4. In the analysis sample pretreatment apparatus 4, the turbid substance having the density smaller than that of the medium component is separated and removed by the pretreatment, a resultant clarified liquid is output from the second opening unit 112 of the analysis sample pretreatment apparatus 4, and the obtained clarified liquid is supplied to the analysis apparatus of the subsequent stage (not shown).

The turbid substance precipitated at a bottom portion of the cell 10 of the analysis sample pretreatment apparatus 1, and the turbid substance that floats at an upper portion of the cell 11 of the analysis sample pretreatment apparatus 4 are discharged from the third opening units 103 and 113 together with the cleaning liquid.

According to the analysis sample pretreatment system 8, the pretreatment is performed on the analysis sample containing both the turbid substance having the density larger than that of the medium component and the turbid substance having the density smaller than that of the medium component, and the resulting clarified analysis sample can be supplied to the analysis apparatus of the subsequent stage.

The analysis sample pretreatment apparatus 1 in the analysis sample pretreatment system 8 may be replaced with the analysis sample pretreatment apparatus 2 or the analysis sample pretreatment apparatus 3.

<Analysis Sample Pretreatment System 9 According to Ninth Embodiment of Invention>

Next, FIG. 19 shows a configuration example of the analysis sample pretreatment system 9 according to the ninth embodiment of the invention.

The analysis sample pretreatment system 9 supplies a clarified liquid to an analysis apparatus of a subsequent stage (not shown). The analysis sample pretreatment system 9 is suitable for a pretreatment of an analysis sample containing both a turbid substance having density larger than that of a medium component and a turbid substance having density smaller than that of the medium component.

The analysis sample pretreatment system 9 is obtained by exchanging an arrangement of the analysis sample pretreatment apparatus 1 (FIG. 3) and the analysis sample pretreatment apparatus 4 (FIG. 9) in the analysis sample pretreatment system 8, and the second opening unit 112 of the analysis sample pretreatment apparatus 4 is connected to the first opening unit 101 of the analysis sample pretreatment apparatus 1 by a pipe.

In the analysis sample pretreatment system 9, the analysis sample containing the turbid substance is input from the first opening unit 111 of the analysis sample pretreatment apparatus 4. In the analysis sample pretreatment apparatus 4, the turbid substance having the density smaller than that of the medium component is separated and removed by the pretreatment, a resultant analysis sample containing the turbid substance that has the density larger than that of the medium component is output from the second opening unit 112 of the analysis sample pretreatment apparatus 4, and the resulting analysis sample is supplied to the first opening unit 101 of the analysis sample pretreatment apparatus 1. In the analysis sample pretreatment apparatus 1, the turbid substance having the density larger than that of the medium component is separated and removed by the pretreatment, a resulting clarified liquid is output from the second opening unit 102 of the analysis sample pretreatment apparatus 1, and the resulting clarified liquid is supplied to the analysis apparatus of the subsequent stage (not shown).

The turbid substance that floats at an upper portion of the cell 11 of the analysis sample pretreatment apparatus 4 and the turbid substance precipitated at a bottom portion of the cell 10 of the analysis sample pretreatment apparatus 1 are discharged from the third opening units 103 and 113 together with the cleaning liquid.

According to the analysis sample pretreatment system 9, the pretreatment is performed on the analysis sample that contains the turbid substance having the density larger than that of the medium component and the turbid substance having the density smaller than that of the medium component, and the resulting clarified liquid can be supplied to the analysis apparatus of the subsequent stage.

The analysis sample pretreatment apparatus 1 in the analysis sample pretreatment system 9 may be replaced with the analysis sample pretreatment apparatus 2 or the analysis sample pretreatment apparatus 3.

<Modification>

Although the ultrasonic wave transducer 202 and the ultrasonic wave reflection plate 206 are attached to the cell holder in the embodiments described above, when the cell is not replaced or when the ultrasonic wave transducer 202 and the ultrasonic wave reflection plate 206 may be replaced together with the cell without being reused, at least one of the ultrasonic wave transducer 202 and the ultrasonic wave reflection plate may be directly attached to the cell. Further, a part of one of a pair of facing planes of the cell may be set as the ultrasonic wave transducer, and a part of the other one may be set as the ultrasonic wave reflection plate.

The invention is not limited to the embodiments described above, and various modifications can be made. For example, the embodiments described above have been described in detail for easy understanding of the invention, and are not necessarily limited to those including all the configurations described above. Further, a part of the configuration of an embodiment may be replaced with or added to the configuration of another embodiment.

REFERENCE SIGN LIST 1 to 5 analysis sample pretreatment apparatus
6 to 9 analysis sample pretreatment system
10 to 16 cell
20 to 24 cell holder
101 first opening unit
102 second opening unit
103 third opening unit
111 first opening unit
112 second opening unit
113 third opening unit
202 ultrasonic wave transducer
203 slit
204 pipe hole
205 observation window
206 ultrasonic wave reflection plate
211 slit
212 observation window
213 pipe hole
221, 222 slit
231 slit
232 pipe hole
301, 302 switching valve
303 pump
304, 305 opening-and-closing valve
311, 312 switching valve

The invention claimed is:

1. An analysis sample pretreatment apparatus in which a clarified liquid is obtained by removing a turbid substance from an analysis sample, the analysis sample pretreatment apparatus comprising:
    a cell configured to store the analysis sample; and
    a cell holder in which at least a part of a housing is opened to mount the cell, wherein
    the cell holder includes an ultrasonic wave transducer and an ultrasonic wave reflection plate that are disposed on a pair of facing planes while sandwiching the cell mounted inside the cell holder,
    the cell includes a first opening unit in which the analysis sample flows, a second opening unit from which the clarified liquid flows, and a third opening unit from which the turbid substance is discharged, and
    in a state where the cell is mounted in the cell holder, the first opening unit is provided at a position lower than an upper end of the ultrasonic wave transducer in a vertical direction, or at a position higher than a lower end of the ultrasonic wave transducer in the vertical direction,
    wherein the cell holder includes a slit on a first side surface of the housing, through which a first pipe connected to the first opening unit passes, a pipe hole disposed in a second side surface of the housing that is orthogonal to the first side surface wherein a second pipe is connected to the second opening unit through the pipe hole, and a third side surface of the housing facing the second side surface wherein a third pipe is connected to the third opening unit through the third side surface.

2. The analysis sample pretreatment apparatus according to claim 1, wherein
    a second side surface of the housing of the cell holder is opened, and the cell is inserted into the cell holder via the second side surface.

3. The analysis sample pretreatment apparatus according to claim 1, wherein
an upper surface of the housing of the cell holder is opened, and
the cell is mounted in the cell holder from above.

4. The analysis sample pretreatment apparatus according to claim 1, wherein
a lower surface of the housing of the cell holder is opened, and
the cell is mounted in the cell holder from below.

5. The analysis sample pretreatment apparatus according to claim 1, wherein
in the state where the cell is mounted in the cell holder,
the first opening unit is provided at a position lower than the upper end of the ultrasonic wave transducer in the vertical direction,
the second opening unit is provided at a position higher than the first opening unit and the third opening unit in the vertical direction, and
the third opening unit is provided at a position lower than the first opening unit in the vertical direction.

6. The analysis sample pretreatment apparatus according to claim 1, wherein
in the state where the cell is mounted in the cell holder,
the first opening unit is provided at a position higher than the lower end of the ultrasonic wave transducer in the vertical direction,
the second opening unit is provided at a position lower than the first opening unit and the third opening unit in the vertical direction, and
the third opening unit is provided at a position higher than the first opening unit in the vertical direction.

7. The analysis sample pretreatment apparatus according to claim 1, wherein
the cell holder includes a pressing member configured to move at least one of the ultrasonic wave transducer and the ultrasonic wave reflection plate to a side of the cell.

8. The analysis sample pretreatment apparatus according to claim 1, wherein
the cell holder includes an observation window, through which a state of the cell is capable of being observed, on at least one surface of the housing.

9. The analysis sample pretreatment apparatus according to claim 1, wherein at least one of an upper surface and a lower surface of an internal space of the cell, not including the first, second and third opening units, has a quadrangular pyramid shape or a curved surface.

10. An analysis sample pretreatment method of an analysis sample pretreatment apparatus, the analysis sample pretreatment apparatus including:
a cell configured to store an analysis sample containing a turbid substance; and
a cell holder in which at least a part of a housing is opened to mount the cell, in which
the cell holder includes an ultrasonic wave transducer and an ultrasonic wave reflection plate that are disposed on a pair of facing planes while sandwiching the cell mounted inside the cell holder, and
the cell includes a first opening unit in which the analysis sample flows, a second opening unit from which a clarified liquid flows, the clarified liquid being obtained by removing the turbid substance from the analysis sample, and a third opening unit from which the turbid substance is discharged,
the analysis sample pretreatment method comprising:
a step of closing the third opening unit;
a step of separating the turbid substance from the analysis sample, and causing the resulting clarified liquid to flow from the second opening unit by causing the analysis sample to flow in from the first opening unit and performing irradiation of ultrasonic waves from the ultrasonic wave transducer;
a step of opening the third opening unit; and
a step of causing a cleaning liquid to flow in from at least one of the first opening unit and the second opening unit, and causing the turbid substance separated from the analysis sample to be discharged from the third opening unit together with the cleaning liquid,
wherein the cell holder includes a slit on a first side surface of the housing, through which a first pipe connected to the first opening unit passes, a pipe hole disposed in a second side surface of the housing that is orthogonal to the first side surface wherein a second pipe is connected to the second opening unit through the pipe hole, and a third side surface of the housing facing the second side surface wherein a third pipe is connected to the third opening unit through the third side surface.

11. An analysis sample pretreatment system in which a plurality of analysis sample pretreatment apparatuses in which a clarified liquid is obtained are arranged in parallel via a switching valve, the clarified liquid being obtained by removing a turbid substance from an analysis sample, the analysis sample pretreatment system comprising:
in each of the analysis sample pretreatment apparatuses,
a cell configured to store the analysis sample; and
a cell holder in which at least a part of a housing is opened to mount the cell, wherein
the cell holder includes an ultrasonic wave transducer and an ultrasonic wave reflection plate that are disposed on a pair of facing planes while sandwiching the cell mounted inside the cell holder,
the cell includes a first opening unit in which the analysis sample flows, a second opening unit from which the clarified liquid flows, and a third opening unit from which the turbid substance is discharged,
in a state where the cell is mounted in the cell holder,
the first opening unit is provided at a position lower than an upper end of the ultrasonic wave transducer in a vertical direction, or at a position higher than a lower end of the ultrasonic wave transducer in the vertical direction, and
while the clarified liquid flows from at least one analysis sample pretreatment apparatus among the plurality of analysis sample pretreatment apparatuses, the turbid substance is discharged from other analysis sample pretreatment apparatuses,
wherein the cell holder includes a slit on a first side surface of the housing, through which a first pipe connected to the first opening unit passes, a pipe hole disposed in a second side surface of the housing that is orthogonal to the first side surface wherein a second pipe is connected to the second opening unit through the pipe hole, and a third side surface of the housing facing the second side surface wherein a third pipe is connected to the third opening unit through the third side surface.

12. An analysis sample pretreatment system that includes a first analysis sample pretreatment apparatus and a second analysis sample pretreatment apparatus and in which a clarified liquid is obtained by removing turbid substances from an analysis sample, the analysis sample containing both the turbid substance having density larger than that of a medium component and the turbid substance having density smaller than that of the medium component, the analysis sample pretreatment system comprising:
in each of the first analysis sample pretreatment apparatus and the second analysis sample pretreatment apparatus,
a cell configured to store the analysis sample; and
a cell holder in which at least a part of a housing is opened to mount the cell, wherein
the cell holder includes an ultrasonic wave transducer and an ultrasonic wave reflection plate that are disposed on a pair of facing planes while sandwiching the cell mounted inside the cell holder, and
the cell includes a first opening unit in which the analysis sample flows, a second opening unit from which the clarified liquid flows, and a third opening unit from which the turbid substance is discharged, and wherein
in the first analysis sample pretreatment apparatus, and in a state where the cell is mounted in the cell holder,
the first opening unit is provided at a position lower than an upper end of the ultrasonic wave transducer in a vertical direction,
the second opening unit is provided at a position higher than the first opening unit and the third opening unit in the vertical direction, and
the third opening unit is provided at a position lower than the first opening unit in the vertical direction, and wherein
in the second analysis sample pretreatment apparatus, and in a state where the cell is mounted in the cell holder,
the first opening unit is provided at a position higher than a lower end of the ultrasonic wave transducer in the vertical direction,
the second opening unit is provided at a position lower than the first opening unit and the third opening unit in the vertical direction, and
the third opening unit is provided at a position higher than the first opening unit in the vertical direction, and wherein
the second opening unit of one of the first analysis sample pretreatment apparatus and the second analysis sample pretreatment apparatus is connected to the first opening unit of the other of first analysis sample pretreatment apparatus and the second analysis sample pretreatment apparatus via a pipe,
wherein the cell holder includes a slit on a first side surface of the housing, through which a first pipe connected to the first opening unit passes, a pipe hole disposed in a second side surface of the housing that is orthogonal to the first side surface wherein a second pipe is connected to the second opening unit through the pipe hole, and a third side surface of the housing facing the second side surface wherein a third pipe is connected to the third opening unit through the third side surface.

* * * * *